July 3, 1945.　　　　F. W. SCHULTZ　　　　2,379,752
BOLT AND MOUNTING THEREFOR
Filed May 15, 1942
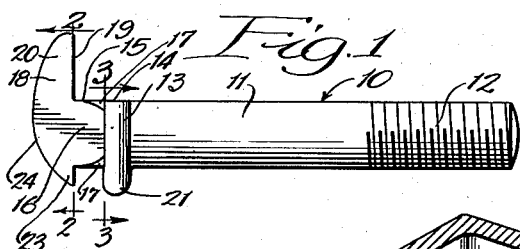
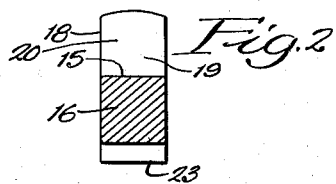
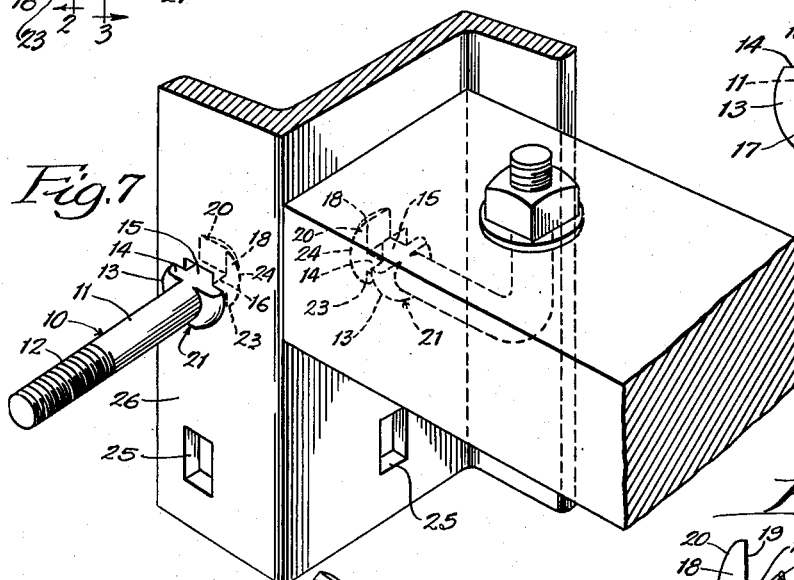
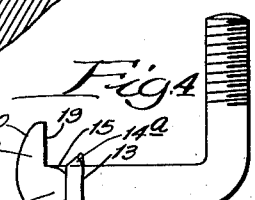
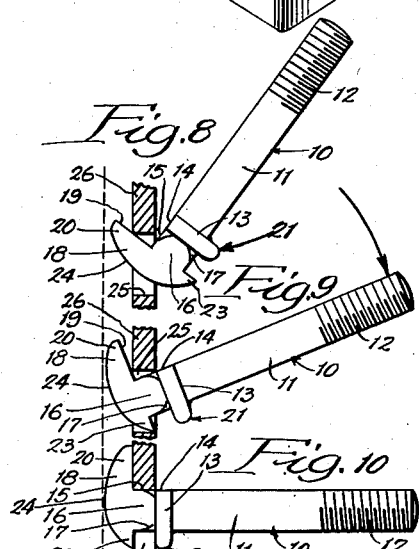
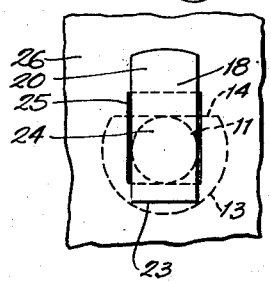
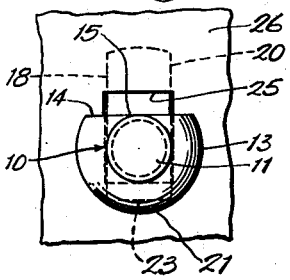
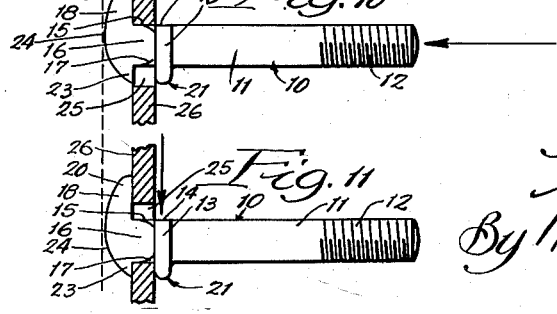
Inventor:
Frederick W. Schultz,
By McCabe, Wendt & Dickinson
Attorneys.

Patented July 3, 1945

2,379,752

UNITED STATES PATENT OFFICE 2,379,752

BOLT AND MOUNTING THEREFOR

Frederick W. Schultz, Wichita, Kans.

Application May 15, 1942, Serial No. 443,085

14 Claims. (Cl. 189—35)

My invention relates to bolts and mountings therefor, and in some aspects it constitutes an improvement upon the collar bolt disclosed in my patent, No. 2,246,457, of June 17, 1941.

It is particularly concerned with an improved mounting for the head end of a bolt in a plate or plate-like flange of a structural member, whereby the head end of the bolt is rigidly mounted with the threaded end of the bolt protruding outwardly from the plate or flange. Bolts thus mounted may be used to clamp sheets of insulation, or the like, and, because the bolts protrude outwardly and are rigidly mounted at their heads, the bolts will successfully withstand considerable abuse when a sheet is pushed upon a plurality of such bolts, so that the bolts punch their own holes through the sheet. Even in applying brackets, hangers, or other such things, where holes are pre-formed for the anchoring bolts, a head-mounted bolt is subjected to considerable abuse in the form of axially directed blows or sidewise blows. Because of the length of the bolt, any sidewise blow, which is apt to be delivered near the threaded end, gives considerable leverage tending to bend, break or loosen the bolt at its head mounting. Therefore, a satisfactory head mounting for a bolt must be rugged, strong and adapted successfully to withstand such strains.

Another attendant problem in the mounting of a protruding bolt is to insure that it is brought into, and maintained at, the proper angle—usually a right angle—to the plane of the member on which it is mounted. Otherwise, when it comes to applying a metal or wood strip or sheet with a number of pre-formed bolt holes, variously angled bolts will not register with the holes.

Frequently a large diameter bolt must be mounted in a relatively narrow supporting flange, or close to a margin of a supporting plate. In such instances, in order to avoid unduly weakening the support, it is desirable to keep the opening for the bolt as narrow as possible. The use of an installation which requires that a portion of the slot be materially wider than the bolt neck is not, therefore, satisfactory in such a case. By my invention, the slot is kept very narrow.

In mounting a J bolt it is necessary at times, to locate the bolt quite close to a flange or wall extending at right angles to its supporting plate or flange, in a manner that would not leave sufficient room to turn the bolt after inserting the head in, for example, a keyhole type slot.

Among the objects of my present invention are the following: firmly to attach a collar bolt to a supporting plate to stand out therefrom, by a simple rocking-in motion without turning the bolt; to mount a bolt on a plate in a slot of minimum width with respect to the supported width of the bolt to minimize the weakening effect of the slot on the supporting plate; to resist a maximum force directed transversely to the axis of the bolt; and yet to release the bolt simply and quickly by a rocking-out motion which removes it from an achored position.

Another object is to arrange a bolt collar in relation to a bolt head to free the head for rocking insertion in a slot which may be shorter than the head, and which may grip the margins of the opening to resist dislodging forces applied to the bolt at points outwardly from the collar.

These and other objects and advantages of my invention are set forth in the following description and the accompanying drawing.

In the drawing, of which there is one sheet:

Fig. 1 is a view in side elevation of a collar bolt embodying my invention;

Fig. 2 is a section taken on the line 2—2 of Fig. 1;

Fig. 3 is a section taken on the line 3—3 of Fig. 1;

Fig. 4 is a view in side elevation of a J bolt embodying my invention;

Fig. 5 is an end elevational view showing the head end of the bolt of Fig. 1 as it appears mounted in a slot in a supporting plate, a fragment only of which is illustrated;

Fig. 6 is a view similar to Fig. 5, showing the shank end of the bolt so mounted;

Fig. 7 is a view in perspective of a Z-bar having slots therein for mounting the bolts of Figs. 1 to 6 inclusive, with one straight, and one J-bolt mounted therein;

Fig. 8 is a view in side elevation of a bolt such as that shown in Fig. 1 mounted with its head inserted in a slot in a fragment of a supporting plate, the plate being shown in section;

Fig. 9 is a view similar to that of Fig. 8, the bolt shank being rocked downwardly to draw the bolt into the slot;

Fig. 10 is a similar view showing the bolt head fully inserted as the bolt shank reaches a position perpendicular to the plane of the supporting plate; and Fig. 11 shows the bolt moved bodily downward from the position of Fig. 10 to its final anchored position.

Referring to the drawing in detail:

The bolt of my invention, which may aptly be termed a collar bolt, is indicated generally by the numeral 10. Its cylindrical shank 11 is threaded at 12 for a required distance.

In the bolt illustrated, a collar 13 is formed integrally with the shank, the collar being cut away as at 14 in the plane of the flat top surface 15 of a squared neck portion 16. While illustrated as being continuous, except for the cut-away portion, the purpose of the collar is to provide abutments for receiving the stresses incidental to its mounting in a supporting plate, and use of separate abutments at such points will be obvious to one skilled in the art. Also it may be preferred to have a continuation of the collar across the top of the bolt. If so, such portion should be beveled outwardly as at 14a in Fig. 4 so as not to interfere with the rocking-in and rocking-out movements of the bolt, as will be brought out later in the specification.

The squared neck portion may be formed, together with the head, preferably by means of upsetting dies, while hot. This hot upsetting process need not be carried to a degree where the neck is fully squared throughout its entire length. As a matter of actual practice, the corners of the neck adjacent the collar, as at 17, are somewhat rounded. The width of each flat face or side of the neck preferably is approximately the same as the diameter of the bolt shank, so that the neck is thus as strong as, and in fact even stronger than, the bolt shank itself.

I wish to say at this point that I have, throughout the specification and claims used the terms, "vertical," "top," etc., to refer conveniently to the positions of the bolt, slot, and support as illustrated. These terms, and others of like import, should not be considered as limitations on the mounting or use of the bolt. It will be apparent to those skilled in the art, that the bolt may be used equally well in supports positioned at any angle from the horizontal to the vertical, and with the slots disposed at any angle in the support.

A head 18 is formed to have its sides in the same planes as the two sides of the neck 16, and with its inner face 19 parallel to the collar 13. The face 19 is spaced from the collar a distance equal to the thickness of a plate 26 on which the bolt is to be mounted. The upper end 20 of the bolt head explains upwardly from the top side 15 of the neck a major distance, while the lower end 23 of the head projects downwardly below the lower face of the neck a minor distance.

The outer face 24 of the head 18 is curved convexly to intersect the plane of the inner face 19 at the lower end of the head to facilitate rocking the bolt into a sohrt slot 25 in a supporting plate 26, th slot being of a width closely to receive the head and neck of the bolt therein.

It will be noted in Fig. 9 that the diagonal distance from the top ends of the collar adjacent the neck, to the lower edge of the heel of the head, determines the minimum length of slot into which the bolt head may be inserted. Usually there is no necessity to hold the length of the slot to this absolute minimum, and I prefer to leave a sufficient clearance between the ends of the slot and the bolt head so that close tolerances in manufacturing are not required. Other dimensions are such as to provide clearances and tolerances to make a practical application.

With the rather rough finish of the bolt, and the likewise somewhat rough walls of the slot in which it is mounted, fairly large tolerances are permissible and the resultant fit still may be, in actual practice, a light to medium drive fit.

Actually during the inserting and seating of the bolt in the slot there usually will be caused a slight ductile flow of metal due to the action of the rough surfaces of the bolt and those of the supporting plate. Also, the filleted corners of the bolt will engage and turn the sharp, possibly finned, edges of the slots. No attempt has been made to illustrate this deformation, since its occurrence, and the nature of the action, will be clear to those familiar with the art, from the above description.

To mount the bolt on a supporting plate in the manner illustrated in Figs. 8 to 11 inclusive, the upper end 20 of the head is placed over the slot and a single hammer tap, as at the point indicated by the arrow 21 in Fig. 8, usually is sufficient to drive the head fully into the slot, substantially to the position of Fig. 8, or probably even to the position of Fig. 9. The shank of the bolt is then swung downward in a clockwise direction from the positions of Fig. 8 or Fig. 9 to a horizontal position as illustrated in Fig. 10.

After the bolt head is inserted as in Fig. 8 or Fig. 9, it is not essential that the upper face 15 of the neck of the bolt be positioned tightly against the top of the slot, since in swinging the bolt down to the position of Fig. 10 the curved outer face 24 of the heel portion of the head will act as a cam against the lower edge of the slot to force the bolt neck upwardly in the slot to the proper position illustrated in Fig. 10.

After the bolt has been inserted, and swung to the position illustrated in Fig. 10, a sharp hammer blow delivered preferably either on or near the mutilated upper collar face 14, or, optionally, on the flattened upper end of the bolt head 18, is used to drive the bolt down in the slot to its final anchored position of Fig. 11.

If a smoothly machined finish is employed on the bolt head, neck, and collar, and a smoothly machined slot is cut in the supporting plate, then the clearances and tolerances between the various inter-fitting parts must be held within proportionately closer limits to provide the desired type of fit.

While I have described the means for obtaining a light to medium drive fit it is apparent that, by increasing the clearance between the sides of the slot and the sides of the bolt head and neck, and by increasing also the clearance between the sides of the plate and the inner face of the bolt head and the collar, a looser fit can be obtained. In fact it is feasible in many types of installations to have a rather free fit, so that the bolt may be hooked into the opening by hand, and will drop from the position of Fig. 10 into its final, anchored position of Fig. 11 by its own weight. It is therefore a simple matter, by regulating the relative dimensions of the bolt, plate, and slot, in this manner, to provide any desired type of fit.

The upper end portion 20 of the head is made rather thick in the direction of the axis of the bolt shank from the plane of its intersection with the top face 15 of the neck, upwardly to a point beyond the top of the slot when the bolt is fully inserted and seated, as shown in Fig. 11. The reason the head is thus thickened is apparent from Fig. 11 which shows that, while the lower or heel portion of the head hooks closely over the lower edge of the slot, the upper end of the head must span the small space between the top face of the neck and the top of the slot. The head therefore must have a considerable amount of strength to transmit the stresses to which it may be subjected, across the space between the top face of the bolt neck and the plate upon which the top portion 24 of the bolt head rests.

The bolt is extremely strong under tension since the heel 23 of the head is in direct shear relationship to the lower edge of the slot, and the heavy upper portion 20 of the head is in contact with the plate over a very short span, namely the clearance between the top face of the neck and the top of the slot.

An important, though incidental, feature of my invention resides in the fact that it is impossible to insert the collar in the slot, which prevents the bolt passing through the slot and dropping down behind the plate. This is true even when the collar is only slightly larger in diameter than the width of the mounting slot.

A further advantage, which becomes important when working in close quarters, or where the plate in which the bolt is to be mounted is closely adjacent to a wall or backing member, is clearly brought out by the dotted line in Figs. 8, 9, 10 and 11. This dotted line, which represents the greatest amount of projection of the bolt head beyond the plate at each stage of the mounting procedure, graphically illustrates the small clearance necessary behind the mounting plate for inserting the bolt.

The J bolt illustrated in detail in Fig. 4, and in use in Fig. 7, shows the simplicity of this member and its mounting. It is clear from this illustration that there is no need to turn the bolt in mounting it, so that it can be used with a minimum of lateral clearance on either or both sides thereof.

The straight bolt 10 mounted in the comparatively narrow flange of the Z-bar illustrates the small slot required for mounting the bolt. This feature becomes increasingly important as the relative width of the supporting plate is decreased in proportion to the width of the bolt neck, or where the slot must be made near a free edge of a supporting plate, since a wider slot might weaken seriously the supporting member.

One of the very important advantages of my invention resides in the fact that pressure applied upwardly at the threaded outer end of the bolt, will not rock the bolt out of the slot. Both sides and the bottom of the neck of the bolt are in direct contact with the corresponding edges of the slot in which the bolt is mounted, so it is apparent that the bolt thus is firmly held against movement in any of these three directions. But in addition to this anchorage against movement in these directions, it will be noted, particularly in Fig. 11, that the lower edge of the slot is gripped between the heel of the head and the lower side of the collar. This causes a locking or biting action of the upper ends of the collar into the plate at the sides of the slot when an upward force is applied to the outer end of the bolt. This locking action is such that even in a construction where the faces of all the parts are machined with clearances so great that the bolt, when released, falls by its own weight from the position of Fig. 9 to that of Fig. 11, the bolt will withstand a strong upward pull on its outer end without dislodging.

An additional important advantage resides in the fact that as long as the bolt shank is maintained substantially perpendicular to the plane of the plate, the bolt may be moved up or down in the slot without danger of being released from the slot. Therefore, the member secured by the bolt, by holding the bolt against tilting, cooperates with the bolt to prevent it from being rocked to a releasing position.

While I have illustrated a preferred embodiment of my invention, some modifications can be made without departing from the spirit of the invention, and I do not wish to be limited to the precise details of construction set forth, but desire to avail myself of all changes within the scope of the appended claims.

I claim:

1. The combination with a plate-like portion of a structural member having a rectangular slot therein, of a collar bolt mounted in the slot for attaching other members to the structural member, the collar bolt comprising a threaded shank portion extending at right angles to the plane of the plate-like portion, a rectangular neck portion adapted to fit fairly closely within the slot, an elongated head having substantially the same width as the slot, but longer than the slot, the head extending downwardly a minor distance below the neck and extending upwardly a major distance above the neck, a collar encircling the sides and bottom of the neck, and disposed on the other side of the plate-like portion from the head, and in contact with the plate-like portion, the top side of the collar being severed chordially, the minor lower end of the head having direct hooked engagement with the plate below the lower marginal edge of the slot, and the major upper end of the head having hooked engagement with the plate above the upper marginal edge of the slot, the neck being spaced downwardly from the upper edge of the slot.

2. The combination with a plate-like portion of a structural member having an elongated rectangular slot therein, of a mounting bolt having a shank projecting at right angles from the structural member, a rectangular neck integral with the shank, said neck approximately engaging the sides, and spaced from the upper end, of the slot, an abutment means on two sides and the bottom of the bolt adjacent to the neck, said abutment means contacting the opposite side of the structural member from the head, an elongated head of a width not greater than the slot and insertable through the slot, the head having a minor lower end portion extending downwardly from the neck a distance less than the length of the space between the top of the neck and the upper end of the slot, and having a major upper end extending upward from the neck a distance greater than the length of said space, the bolt while projecting at right angles from the structural member being shiftable bodily upward in the slot to free the shank end of the bolt for subsequent upward rocking movement about the upper edge of the slot as a fulcrum to withdraw the bolt head from the slot, said bolt and the plate-like portion constituting the sole means for maintaining the shank rigidly in its outstanding position.

3. The combination with a plate-like portion of a structural member having a slot therein, of a collar bolt mounted in the slot for attaching other members to the structural member, the collar bolt comprising a threaded shank portion extending at right angles to the plane of the plate-like portion, a flat-sided neck portion adapted to fit between the sides of the slot, an elongated head having substantially the same width as the slot, the head extending downwardly in hooked engagement with the lower marginal edge of the slot, a collar encircling the sides and bottom of the neck, and disposed on the other side of the plate-like portion from the head, and in contact with the plate-like portion, the slot being longer than the transverse dimension of the neck in the direction of the length of the slot by an amount not less than the length of the downward extension of the bolt head, the top of the collar being severed, chordially, to provide rocking clearance, whereby the bolt is free for upward bodily movement to free the hooked lower end of the head for a rocking-out withdrawing motion of the neck and head from the slot.

4. The combination with a plate-like portion of a structural member having a slot therein, of a collar bolt mounted in the slot for attaching other members to the structural member, the collar bolt comprising a threaded shank portion extending at right angles to the plane of the plate-like portion, a flat-sided neck portion adapted to fit within the slot with a flat side thereof adjacent a side wall of the slot, the bolt having an elongated head of no greater width than the slot, the head having a downwardly extending portion hooked directly over the plate below the lower marginal edge of the slot, the slot being longer than the vertical width of the neck plus the length of the downwardly extending head portion but shorter than the length of the elongated head, and abutment means on a side and the bottom of the neck, and disposed on the other side of the plate-like portion from the head, and in contact with the plate-like portion, whereby the bolt is free for bodily upward movement to free the head from hooked engagement with the plate, whereupon the bolt is free for rocking-out movement to withdraw the neck and head from the slot, but it is retained against removal by translation along the axis of the bolt.

5. The combination with a plate-like portion of a structural member having a slot therein, of a collar bolt mounted in the slot for attaching other members to the structural member, the collar bolt comprising a shank portion extending outwardly from the plane of the plate-like portion, a flat sided neck portion adapted to fit within the slot with a flat side thereof closely adjacent a wall of the slot, an elongated head of no greater width than the slot, and adapted to be inserted through the slot, the head comprising a downwardly extending portion hooked over the plate below the lower marginal edge of the slot, the lower end of the head terminating in a relatively thin transverse edge, a longer upwardly extending head portion hooked over the plate above the upper marginal edge of the slot, and abutment means on at least one side of the neck and in contact with the other side of the plate-like portion from the head, and along a side of the slot, the neck being spaced downwardly from the upper end of the slot a distance not less than the distance from the bottom of the neck to the lower end of the head, whereby the bolt is locked against upward tilting of the shank, but is free for bodily upward movement to release the lower end of the head from hooked engagement with the plate, whereupon the bolt is freed for rocking-out movement to withdraw the neck and head from the slot.

6. The combination with a plate-like portion of a structural member having an elongated slot therein, of a collar bolt mounted in the slot for attaching other members to the structural member, the collar bolt comprising a shank portion extending at right angles to the plane of the plate-like portion, a flat-sided neck portion adapted to fit within the slot, with a flat side thereof closely adjacent a side wall of the slot, an elongated head of no greater width than the slot, the head having a downwardly extending portion hooked over the plate below the lower marginal edge of the slot, the slot being longer than the vertical dimension of the neck plus the length of the downwardly extending head portion but shorter than the length of the elongated head, and a collar element disposed on the other side of the plate-like portion from the head, and in contact with the plate-like portion along at least one side of the slot, whereby the bolt is locked against upward tilting of the shank or removal by translation along the axis of the bolt, but is free for bodily upward movement to free the head from hooked engagement with the plate, whereupon the bolt is freed for rocking-out movement to withdraw the neck and head from the slot.

7. The combination with a plate-like portion of a structural member having an elongated slot therein, of a collar bolt mounted in the slot for attaching other members to the structural member, the collar bolt comprising a threaded shank portion extending at right angles to the plane of the plate-like portion, a flat-sided neck portion adapted to fit closely within the slot with a flat side thereof closely adjacent a side wall of the slot, an elongated head of no greater width than the slot, the head having a downwardly extending portion hooked over the plate below the lower marginal edge of the slot, the slot being longer than the transverse dimension of the neck in the direction of the length of the head, plus the length of the downwardly extending head portion but shorter than the length of the elongated head, and a collar element disposed on the other side of the plate-like portion from the head, and in contact with the plate-like portion along at least one side of the slot, said slot side extending in the long direction of the head, whereby the bolt is locked against upward tilting of the shank or removal by translation along the axis of the bolt, but is free for bodily upward movement to free the head from hooked engagement with the plate, whereupon the bolt is freed for rocking-out movement to withdraw the neck and head from the slot.

8. A collar bolt for rocking insertion in, and withdrawal from, a slotted opening in a plate of predetermined thickness, the collar bolt comprising a shank, an integral rectangular neck portion, an elongated head wholly contained between the planes defining two opposite sides of the neck portion, one end of the head projecting a major distance and the other end of the head projecting a minor distance in opposite directions laterally from the neck, the inner faces of the two end portions of the head lying in the same plane and at right angles to the axis of the neck, the end of the head which projects a minor distance terminating in a beveled end, and a collar element projecting laterally beyond the said two sides of the neck, said flanges being spaced from the inner end of the head in the direction of the axis of the neck a predetermined distance, the side of the neck in the direction of the major head portion being free from projections in the axially transverse plane defined by the two flanges.

9. A bolt, to be mounted in a slotted plate or the like to maintain itself therein in rigid outstanding position, comprising a shank threaded inwardly from the outstanding end, a head having a pair of flat opposite sides spaced apart by the thickness of the bolt shank to be passed through such a slot, said head having opposite ends extending at right angles to the shank axis to lie against one side of such a plate, one of the ends extending a major and the other a minor distance and presenting shankwardly facing shoulders in a plane normal to the axis, an integral collar element outstanding from the shank and spaced axially from the head to engage the side of such a plate opposite from the head, and a neck extending between the head and the collar element to lie within such a slot and having a flat side to engage an edge of the slot to prevent turning of the bolt within the slot, the head and neck being insertible in such a slot by a successive rocking-in and bodily lateral movements, the collar, on the side of the bolt which carries the longer head extension, being relieved to afford a rocking-in clearance.

10. A rocking-in bolt to be mounted at its head end upon a plate which has a parallel sided slot therethrough, to maintain itself firmly in outstanding, non-turning position relatively to the plate, even in the absence of other parts, the bolt comprising a threaded shank, a head having flat opposite sides and having oppositely extending major and minor end portions, for insertion through such a slot, to lie at the back side of such a plate, an integral collar element projecting from the shank and spaced from the head to lie at the front side of such a plate, and a flat-sided neck lying wholly between the planes, parallel to the axis of the shank, which define the two flat sides of the head, a flat side of the neck being adapted to engage an edge of such a slot to prevent turning within the slot, the head and neck being insertible in such a slot by a rocking-in motion and adapted for anchoring therein by a subsequent bodily shifting lateral movement in the direction of the minor end of the head to grip the two sides of such a plate between the head ends and the collar element.

11. A rocking-in bolt to be mounted in a slotted plate-like member to maintain itself in outstanding position thereon, the bolt having a threaded shank, a flat sided neck of a width substantially fitting in the slot to have a flat side of the neck engage a side of such a slot to prevent turning of the bolt in the slot, and a head having oppositely extending major and minor head portions with flat inner, and convexly curved outer, surfaces, the flat inner head surfaces defining a plane normal to the bolt axis, and adapted to lie against the rear of such a plate above and below the slot, respectively, and a collar element projecting laterally from the shank and spaced a predetermined plate-thickness distance from the flat inner head surfaces, the head and neck being insertible in such a slot by a rocking-in motion and adapted for anchoring therein by a subsequent bodily lateral movement in the direction of the minor end of the head to grip the two sides of such a plate between the flat inner head surfaces and the collar element.

12. A bolt to be mounted in a slotted plate or the like to maintain itself therein in rigid outstanding position, comprising a shank threaded inwardly from the outstanding end, a flat sided neck portion adapted to be inserted in such a slot to have a flat side thereof engaging an edge of the slot to prevent turning of the bolt within the slot, an integral collar element outstanding from the shank at the shank end of the neck to engage one side of such a plate, and an elongated head having laterally projecting ends of unequal lengths with flat co-planar inner surfaces adapted to lie against the other side of such a plate, whereby the head and neck are insertible in the slot by a rocking-in movement and adapted for anchoring therein by a subsequent bodily lateral shifting movement in the direction of said head end to grip the two sides of such a plate between the collar element and the flat inner head surface.

13. In a bolt mounting assembly, the combination of a metal member having a substantially flat portion provided with an elongated aperture, said aperture having parallel opposite sides and a bolt held in rigid outstanding position in said aperture, said bolt comprising a shank provided with a collar having a plane surface adapted to engage the front side of said flat portion, said bolt having a neck portion of sufficient width to fit in between said parallel sides and having a head, said head having a depending portion adapted to engage on the lower side of the flat portion opposite said collar and having an upwardly extending portion of sufficient length to engage the flat portion beyond the aperture, the size of the aperture being sufficient to pass the neck and depending portion of the head whereby the head of the bolt may be inserted with a rocking motion and the bolt may be fixed by moving it downward until the collar and depending portion engage both sides of the flat portion of the metal member.

14. In a bolt mounting assembly, the combination of a metal member having a substantially flat portion provided with an elongated aperture, said aperture having parallel opposite sides and a bolt held in rigid outstanding position in said aperture, said bolt comprising a shank provided with a collar having a plane surface adapted to engage the front side of said flat portion, said bolt having a neck portion of sufficient width to fit in between said parallel sides and having a head, said head having a depending portion adapted to engage on the lower side of the flat portion opposite said collar and having an upwardly extending portion of sufficient length to engage the flat portion beyond the aperture, the size of the aperture being sufficient to pass the neck and depending portion of the head whereby the head of the bolt may be inserted with a rocking motion and the bolt may be fixed by moving it downward until the collar and depending portion engage both sides of the flat portion of the metal member, the said collar terminating adjacent the upper side of the neck to prevent interference between the collar and upper edge of the aperture in the insertion of the bolt.

FREDERICK W. SCHULTZ.